US012625562B2

(12) United States Patent
Joo et al.

(10) Patent No.: US 12,625,562 B2
(45) Date of Patent: May 12, 2026

(54) DISPLAY DEVICE RECOGNIZING USER GESTURE THROUGH SENSOR AND CONTROLLING METHOD THEREOF

(71) Applicant: Samsung Electronics Co., Ltd., Suwon-si (KR)

(72) Inventors: Sunwoong Joo, Suwon-si (KR); Jongin Lee, Suwon-si (KR); Yongdeok Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/042,573

(22) Filed: Jan. 31, 2025

(65) Prior Publication Data

US 2025/0181174 A1      Jun. 5, 2025

Related U.S. Application Data

(63) Continuation of application No. PCT/KR2023/009403, filed on Jul. 4, 2023.

(30) Foreign Application Priority Data

Aug. 1, 2022    (KR) ........................ 10-2022-0095714

(51) Int. Cl.
*G06F 3/01*          (2006.01)
*G06V 40/20*        (2022.01)
(52) U.S. Cl.
CPC .............. *G06F 3/017* (2013.01); *G06V 40/28* (2022.01)

(58) Field of Classification Search
CPC .......... G06F 3/017; G06F 3/0304; G06F 3/01; G06V 40/28; G06V 10/44; G06V 40/10; G06V 40/107; G06V 40/20
See application file for complete search history.

(56) References Cited

U.S. PATENT DOCUMENTS 9,479,721 B2    10/2016  Ivanich et al.
9,557,821 B2     1/2017  Tanaka et al.
(Continued)

FOREIGN PATENT DOCUMENTS

EP        2 908 219 A1     8/2015
JP       2015082192 A      4/2015
(Continued)

OTHER PUBLICATIONS

International Search Report for PCT/KR2023/009403 mailed Oct. 12, 2023, 4 pages with English translation.
(Continued)

*Primary Examiner* — Grant Sitta
(74) *Attorney, Agent, or Firm* — Nixon & Vanderhye P.C.

(57) ABSTRACT

A display device is provided. The display device includes: a display, a sensor and at least one processor, comprising processing circuitry, individually and/or collectively, configured to: control the display to display an indicator, recognize a user's body in an image received through the sensor in real time, identify a first area of the body as a reference point, and identify a second area of the body as an auxiliary point, identify a change in coordinates of the reference point and a change in coordinates of the auxiliary point based on a plurality of image frames included in the image, and move the indicator based on the change in the coordinates of the reference point and the change in the coordinates of the auxiliary point.

17 Claims, 9 Drawing Sheets

<t-1>

(56)     References Cited

U.S. PATENT DOCUMENTS

| | | | |
|---|---|---|---|
| 9,696,808 | B2 | 7/2017 | Nishihara et al. |
| 9,734,392 | B2 | 8/2017 | Suzuki |
| 9,910,502 | B2 | 3/2018 | Geurts et al. |
| 10,248,218 | B2 | 4/2019 | Katz et al. |
| 10,438,078 | B2 | 10/2019 | Matsunami |
| 11,294,470 | B2* | 4/2022 | Dal Zot .................. G06F 3/011 |
| 11,294,475 | B1 | 4/2022 | Pinchon et al. |
| 11,508,121 | B2* | 11/2022 | Savaroche ............ G06F 3/0304 |
| 11,662,827 | B2* | 5/2023 | Arora ..................... G06V 10/87 |
| | | | 345/156 |
| 2013/0222239 | A1 | 8/2013 | Galor |
| 2013/0241819 | A1 | 9/2013 | Yamashita |
| 2013/0285904 | A1 | 10/2013 | Kaplan et al. |
| 2013/0301926 | A1* | 11/2013 | Eilat ...................... G06V 40/28 |
| | | | 382/195 |
| 2015/0261409 | A1 | 9/2015 | Tanaka |
| 2016/0266649 | A1* | 9/2016 | Wang ................... G06F 3/0325 |
| 2016/0320846 | A1* | 11/2016 | De Michele ........ G06V 40/107 |
| 2017/0097687 | A1 | 4/2017 | Pinault et al. |
| 2017/0185831 | A1* | 6/2017 | Li ........................ G06V 40/107 |
| 2020/0285320 | A1* | 9/2020 | Hsieh ...................... G06F 3/011 |
| 2022/0334674 | A1* | 10/2022 | Irie .......................... G06F 3/011 |
| 2022/0383523 | A1* | 12/2022 | Wu ......................... G06V 40/28 |
| 2023/0027040 | A1* | 1/2023 | Wang ................... G06V 10/809 |
| 2023/0176658 | A1* | 6/2023 | Lee .......................... G06F 3/167 |
| | | | 345/156 |
| 2023/0205320 | A1* | 6/2023 | Mantri ................... G06V 40/11 |
| | | | 715/863 |

FOREIGN PATENT DOCUMENTS

| | | |
|---|---|---|
| JP | 6110857 B2 | 3/2017 |
| JP | 2017174228 A | 9/2017 |
| KR | 100962569 B1 | 6/2010 |
| KR | 101184742 B1 | 9/2012 |
| KR | 20130105321 A | 9/2013 |
| KR | 20150106823 A | 9/2015 |
| KR | 101631015 B1 | 6/2016 |
| WO | WO 2019/168190 A1 | 9/2019 |

OTHER PUBLICATIONS

Written Opinion of the ISA for PCT/KR2023/009403 mailed Oct. 12, 2023, 4 pages.
Extended European Search Report dated Oct. 2, 2025 for EP Application No. 23850266.0.

\* cited by examiner

<t-1>                    <t>

<t-1>                              <t>

DISPLAY DEVICE RECOGNIZING USER GESTURE THROUGH SENSOR AND CONTROLLING METHOD THEREOF

CROSS-REFERENCE TO RELATED APPLICATIONS

This application is a continuation of International Application No. PCT/KR2023/009403 designating the United States, filed on Jul. 4, 2023, in the Korean Intellectual Property Receiving Office and claiming priority to Korean Patent Application No. 10-2022-0095714, filed on Aug. 1, 2022, in the Korean Intellectual Property Office, the disclosures of each of which are incorporated by reference herein in their entireties.

BACKGROUND

Field

The disclosure relates to a display device that recognizes a user gesture via a sensor and a controlling method thereof, and for example, to a display device that recognizes a user gesture and moves and displays an indicator and a controlling method thereof.

Description of Related Art

Recently, with technological advances in the field of display devices, various types of display devices have been developed and popularized.

Various types of user interfaces for controlling display devices have also been developed and popularized.

In particular, research on the so-called Natural User Interface (NUI) that detects natural human body movements and controls a display device using them rather than controlling the display device using peripheral devices such as a keyboard, a mouse, or a remote controller has been actively conducted.

When controlling a device using body movements, the challenge is to detect the body movements with high accuracy so that fine control can be achieved while ignoring unnecessary body movements to match the user's intent.

When controlling a display device by detecting the user's body movements and moving a cursor, etc. according to the detected body movements, there is a growing need for a device controlling method that accurately reflects even the slightest movements of the cursor.

SUMMARY

A display device according to an example embodiment includes: a display, a sensor and at least one processor, comprising processing circuitry, individually and/or collectively, configured to: control the display to display an indicator, recognize a user's body in an image received through the sensor in real time, identify a first area of the body as a reference point, identify a second area of the body as an auxiliary point, identify a change in coordinates of the reference point and a change in coordinates of the auxiliary point based on a plurality of image frames included in the image, and move the indicator based on the change in the coordinates of the reference point and the change in the coordinates of the auxiliary point, wherein the change in the coordinates of the auxiliary point corresponds to the relative coordinate change of the auxiliary point with reference to the reference point.

A method of controlling a display device according to an example embodiment includes: displaying an indicator, recognizing a user's body in an image received in real time, identifying a first area of the body as a reference point, and identifying a second area of the body as an auxiliary point, identifying a change in coordinates of the reference point and a change in coordinates of the auxiliary point based on a plurality of image frames included in the image, and moving the indicator based on the change in the coordinates of the reference point and the change in the coordinates of the auxiliary point, wherein the change in the coordinates of the auxiliary point corresponds to the relative coordinate change of the auxiliary point with reference to the reference point.

In a non-transitory computer-readable recording medium including a program that when executed causes a display device to perform a method of controlling the display device according to an example embodiment, the method of controlling the display device including: displaying an indicator, recognizing a user's body in an image received in real time, identifying a first area of the body as a reference point, and identifying a second area of the body as an auxiliary point, identifying a change in coordinates of the reference point and a change in coordinates of the auxiliary point based on a plurality of image frames included in the image, moving the indicator based on the change in the coordinates of the reference point and the change in the coordinates of the auxiliary point, wherein the change in the coordinates of the auxiliary point corresponds to the relative coordinate change of the auxiliary point with reference to the reference point.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
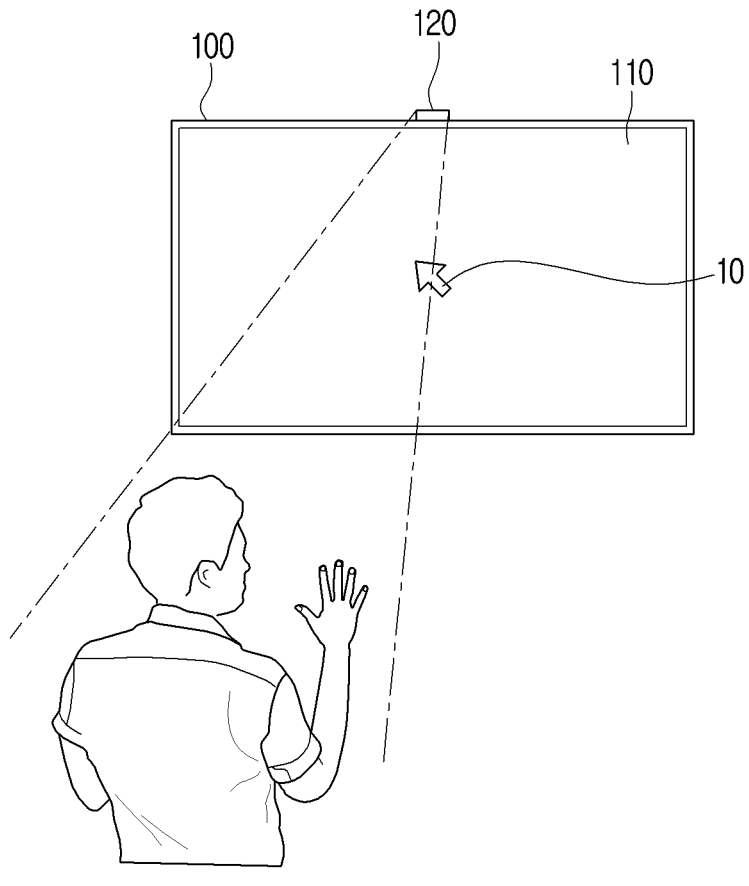
FIG. 1 is a diagram illustrating an example display device according to various embodiments.

Terms used in this disclosure will be described briefly and then, the present disclosure will be described in greater detail.

General terms that are currently widely used are selected as the terms used in the various embodiments of the disclosure in consideration of their functions in the disclosure, but may be changed based on the intention of those skilled in the art or a judicial precedent, the emergence of a new technique, or the like. In addition, in various instances, terms may be arbitrarily used, in which case, the meanings of such terms will be described in detail in the corresponding descriptions of the disclosure. Therefore, the terms used in the disclosure are defined on the basis of the meanings of the terms and the overall contents throughout the disclosure rather than simple names of the terms.

The various embodiments of the present disclosure may be modified in various ways, and various embodiments are illustrated in the drawings and described in detail in the detailed description. However, it is to be understood that the disclosure is not limited to specific embodiments, but include all modifications, equivalents, and/or alternatives according to various embodiments of the disclosure. In describing the disclosure, when it is decided that a detailed description for the known functions or configurations related to the disclosure may unnecessarily obscure the gist of the disclosure, the detailed description therefor may be omitted.

Terms such as "first", "second", etc. may be used to describe various components, but the components should not be limited by the terms. The terms are used only to distinguish one component from another.

Singular expressions include plural expressions unless the context clearly dictates otherwise. In this disclosure, terms such as "comprise" or "have" are intended to designate the presence of features, numbers, steps, operations, components, parts, or a combination thereof described in the disclosure, but are not intended to exclude in advance the possibility of the presence or addition of one or more of other features, numbers, steps, operations, components, parts, or a combination thereof.

In various embodiments, a "module" or a "unit" may perform at least one function or operation, and be implemented as hardware or software or be implemented as a combination of hardware and software. In addition, a plurality of "modules" or a plurality of "units" may be integrated into at least one module and be implemented as at least one processor (not shown) except for a 'module' or a 'unit' that needs to be implemented as specific hardware.

Hereinafter, various example embodiments of the disclosure will be described in greater detail with reference to the accompanying drawings. However, the present disclosure may be implemented in various different forms and is not limited to the various example embodiments described herein. In addition, in order to clearly describe the present disclosure in the drawings, parts that are not related to the description may be omitted, and similar parts are given similar drawing reference numerals throughout the disclosure.

FIG. 1 is a diagram illustrating an example display device according to various embodiments.

A display device 100 according to an embodiment may display various types of content.

According to an embodiment, the display device 100 may be any device having a display function, such as, for example, but not limited to video wall, large format display (LFD), digital signage, digital information display (DID), projector display, electric whiteboard display, etc.

The display device 100 may be may be placed in a wall-mounted form or may be placed in a stand form.

The display device 100 may also be implemented as a touch screen coupled with a touch sensor, a flexible display, a rollable display, a three-dimensional (3D) display, a display where a plurality of display modules are physically connected, and the like.

The display device 100 according to an embodiment may display an indicator 10 through a display 110.

The display device 100 may recognize a user gesture, and may move the indicator 10 in response to the recognized user gesture.

The indicator 10 may be implemented, for example, and without limitation, as a pointer, a cursor (e.g., a character cursor, a mouse cursor, etc.), a highlighter that focuses (or emphasizes) one of the characters on the screen, an item, an object, etc.

The user gesture may include a movement (e.g., shift) of a specific area (e.g., wrist, palm, etc.) of the user's body. However, the present disclosure is not limited thereto, and the user gesture may include tap, double tap, swipe, flick, pinch in/out, rotate, etc. of a specific area.

For example, a tap gesture may include a short and light tap with one finger, and a double tap gesture might include two quick, consecutive taps.

A swipe gesture may include a gesture that moves a certain distance while holding a tap, such as moving a certain distance to the left or right.

A flick gesture may include a gesture of quickly scrolling horizontally or vertically while holding a tap.

A pinch in/out gesture is a gesture for zooming in/out, and when the distance between two fingers increases, it may be a pinch out gesture for zooming in, and when the distance between two fingers decreases, it may be a pinch in gesture for zooming out.

A rotate gesture includes a gesture that changes from vertical to horizontal or horizontal to vertical, and may be a gesture that rotates a screen (or an object within the screen).

Referring to FIG. 1, the display device 100 may recognize a user's body in an image received in real time via the sensor 120, and may identify a movement of a specific area of the user's body. Subsequently, the display device 100 may move the indicator 10 based on the movement of the specific area.

The display device 100 according to an embodiment may identify a first area and a second area on the user's body, and may move the indicator 10 based on the movement of the first area and the movement of the second area.

The display device 100 according to an embodiment moves the indicator 10 based on the movement of each of a plurality of areas (e.g., the first area and the second area), so that the indicator 10 can be moved more closely to the user's intent, and can be moved more precisely.

Figure 2:
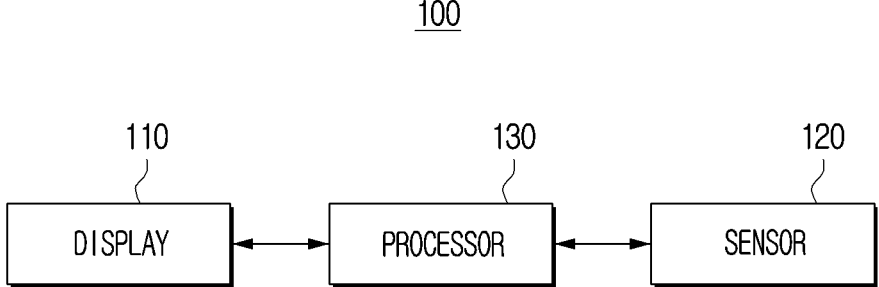
FIG. 2 is a block diagram illustrating an example configuration of a display device according to various embodiments.

FIG. 2 is a block diagram illustrating an example configuration of a display device according to various embodiments.

Referring to FIG. 2, the display device 100 according to an embodiment includes a display 110, a sensor 120, and one or more processors (e.g., including processing circuitry) 130.

The display 110 according to an embodiment may be implemented as a display in various forms, such as, for example, and without limitation, a liquid crystal display (LCD), organic light-emitting diode (OLED), liquid crystal on silicon (LCoS), digital light processing (DLP), quantum dot (QD) display panel, quantum dot light-emitting diodes (QLEDs) micro light-emitting diodes (μLEDs), Mini LEDs, and the like.

However, the present disclosure is not limited thereto, and the display device 100 may be implemented as a projector device (or projector display) that projects an image, and the display 110 may be implemented as a projection that projects an image.

The sensor 120 according to an embodiment may detect a user located in the vicinity (e.g., at least one of the front, rear, or side) of the display device 100.

For example, the sensor 120 may be implemented as a camera, and the camera may capture a still image at a specific point in time, or may capture still images continuously.

The display device 100 according to an embodiment may identify a user located in the vicinity of, or adjacent to, the display device 100 based on the image received from the sensor 120.

Referring to FIG. 1, the display device 100 may recognize a user (e.g., a user's body) in an image received in real time via the sensor 120. Here, the sensor 120 photographs the front of the display device 100, and thus, the display device 100 may recognize a user located in front of the display device 100.

According to an embodiment, the sensor 120 may be implemented as a camera, and here, the camera may obtain a color image, a depth image, etc. However, this is only an example, and the sensor 120 may be implemented as a time-of-flight (ToF) sensor, a lidar sensor, a radar sensor, an ultrasonic sensor, an infrared sensor, or the like. For example, the infrared sensor may recognize a user by detecting infrared light information.

The one or more processors 130 according to an embodiment may include various processing circuitry and are electrically connected to memory (not shown), and control the overall operations of the display device 100.

According to an embodiment, the processor 130 may be implemented as a digital signal processor (DSP) for processing digital signals, a microprocessor, or a time controller (TCON). However, the processor 130 is not limited thereto, and the processor 130 may include one or more of a central processing unit (CPU), a micro controller unit (MCU), a micro processing unit (MPU), a controller, an application processor (AP), a communication processor (CP), an ARM processor, and an Artificial Intelligence (AI) processor, or may be defined as the corresponding term.

Further, the processor 130 may be implemented as a system on chip (SoC) with embedded processing algorithms, a large scale integration (LSI), or in the form of a field programmable gate array (FPGA). The processor 130 may perform various functions by executing computer executable instructions stored in the memory. The processor may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

The processor 130 according to an embodiment may control the display 110 to display the indicator 10.

The processor 130 may recognize the user's body in the image received in real time via the sensor 120. For example, the processor 130 may recognize a body part of the user, such as face, hand, arm, leg, or the like, in the image received in real time via the sensor 120, and may track the movement of the recognized body part.

The processor 130 according to an embodiment may identify a first area of the body as a reference point and a second area as an auxiliary point. Descriptions of the reference point and the auxiliary point will be provided in greater detail below with reference to FIG. 3.

The processor 130 may identify a change in the coordinates of the reference point and a change in the coordinates of the auxiliary point based on a plurality of image frames included in the image.

The processor 130 may move the indicator 10 based on the change in the coordinates of the reference point and the change in the coordinates of the auxiliary point.

Figure 3:
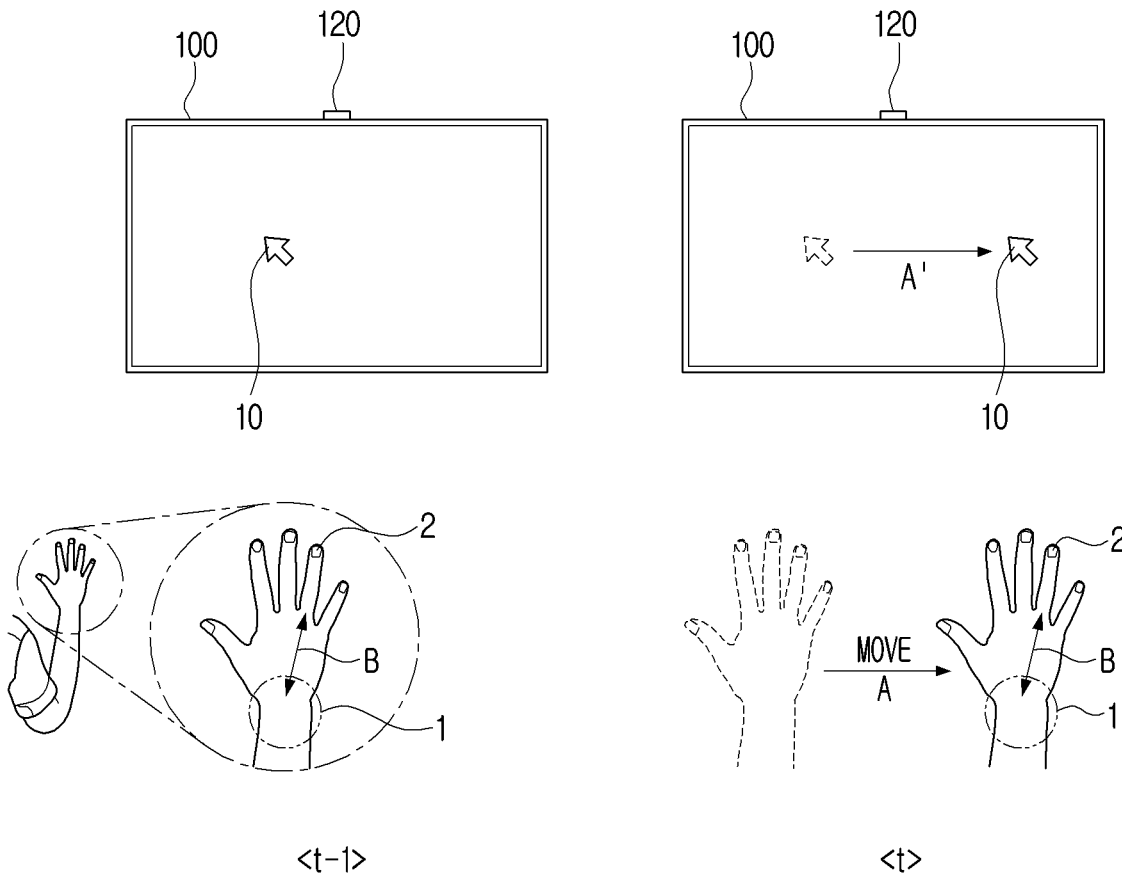
FIG. 3 is a diagram illustrating movement of an indicator in response to a movement of a first area according to various embodiments.

FIG. 3 is a diagram illustrating movement of an indicator in response to a movement of a first area according to various embodiments.

The processor 130 according to an embodiment may identify a first area of the user's body as a reference point 1 in the image received from the sensor 120. The first area may include a preset area of the body (e.g., wrist, palm, etc.).

Further, the processor 130 may identify a second area of the user's body as an auxiliary point 2 in the image received from the sensor 120. The second area may include a preset area of the body (e.g., third finger, fourth finger, etc.).

However, the present disclosure is not limited thereto, and each of the first area and the second area may be preset (e.g., specified) as one of various body parts of the user.

For example, the processor 130 may identify the face of the body as the first area and the palm of the hand as the second area.

For example, the processor 130 may identify the pupil as the first area and the third finger as the second area.

For convenience of explanation, it is assumed that the processor 130 identifies the wrist of the body as the first area and the fourth finger as the second area.

The processor 130 according to an embodiment may identify the first area as the reference point 1, and may move the indicator 10 to correspond to a change in the coordinates of the reference point 1.

A change in the coordinates of the reference point 1 may refer to a vector value including a change in size and a change in direction. For example, a change in the coordinates of the reference point 1 may include a change in the coordinate values with reference to the x-axis and the y-axis. The present disclosure is not limited thereto, and a change in the coordinates of the reference point 1 may include a change in the coordinate values based on the x-axis, the y-axis, and the z-axis.

Referring to FIG. 3, the processor 130 may identify coordinate information (or location information) of the reference point 1 corresponding to the first area based on a frame corresponding to time t−1 among a plurality of image frames included in the image.

The processor 130 may identify coordinate information (or location information) of the reference point 1 corresponding to the first area based on a frame corresponding to time t among the plurality of image frames included in the image.

As shown in FIG. 3, the processor 130 may identify coordinate change A of the reference point 1 based on the coordinate information of the reference point 1 at time t–1 and the coordinate information of the reference point 1 at time t.

The processor 130 may move the indicator 10 by A' according to the coordinate change A of the reference point 1.

In addition to the reference point 1, the processor 130 according to an embodiment may move the indicator 10 by additionally using the auxiliary point 2.

For example, the processor 130 may identify coordinate information (or location information) of the auxiliary point 2 corresponding to the second area based on a frame corresponding to time t–1 among the plurality of image frames included in the image. The processor 130 may identify relative coordinate information of the auxiliary point 2 with reference to the reference point 1 at time t–1. For example, the processor 130 may identify the relative coordinate information of the auxiliary point 2 with reference to the reference point 1 at time t–1 as (0, 0).

The processor 130 may identify coordinate information (or location information) of the auxiliary point 2 corresponding to the second area based on a frame corresponding to time t among the plurality of image frames included in the image. Subsequently, the processor 130 may identify coordinate information of the auxiliary point 2 with reference to the reference point 1 at time t as (0, 0).

For example, the processor 130 may identify relative coordinate information of the auxiliary point 2 with reference to the reference point 1 based on Equation 1 below.

$$SubPositionDiff(t) = \qquad\qquad\text{[Equation 1]}$$
$$Distance(BasePosition(t)?\ SubPosition(t))$$

Here, BasePosition(t) may be the coordinate information of the reference point 1 at time t, SubPosition(t) may be the coordinate information of the auxiliary point 2 at time t, and SubPositionDiff(t) may be the relative coordinate information of the auxiliary point 2 with reference to the reference point 1 at time t.

The processor 130 may identify coordinate change B of the auxiliary point 2 based on the relative coordinate information of the auxiliary point 2 with reference to the reference point 1 at time t–1 and the relative coordinate information of the auxiliary point 2 with reference to the reference point 1 at time t, as shown in FIG. 3. The coordinate change B of the auxiliary point 2 may correspond to the relative coordinate change of the auxiliary point 2 with reference to the reference point 1. For example, the processor 130 may identify the coordinate change B of the auxiliary point 2 by calculating SubPositionDiff(t)–SubPositionDiff(t–1).

The coordinate change B of the auxiliary point 2 may refer to a vector value including a change in size and a change in direction. For example, a change in the coordinates of the auxiliary point 2 may include a change in the coordinate values with reference to the x-axis, the y-axis, and the reference point 1. The present disclosure is not limited thereto, and a change in the coordinates of the auxiliary point 2 may include a change in the coordinate values with reference to the x-axis, the y-axis, the z-axis, and the reference point 1 (0, 0, 0).

The processor 130 may move the indicator 10 based on the coordinate change A of the reference point 1 and the coordinate change B of the auxiliary point 2.

For example, the processor 130 may move the indicator 10 based on Equation 2 below.

$$PointerPosition(t) = BasePosition(t) + SubPositionDiff(t)\qquad\text{[Equation 2]}$$

Here, PointerPosition(t) may refer to the coordinate information of the indicator 10 at time t.

Thus, the processor 130 may move the indicator 10 by calculating PointerPosition(t–1)–PointerPosition(t).

The processor 130 according to an embodiment may obtain the coordinate information of the indicator 10 by applying different weights to the coordinate change A of the reference point 1 and the coordinate change B of the auxiliary point 2.

In an example, the processor 130 may apply a first weight W1 to the coordinate change A of the reference point 1 and a second weight W2 to the coordinate change B of the auxiliary point 2. The processor 130 may obtain coordinate information of the indicator 10 by summing the coordinate change A where the first weight W1 is applied and the coordinate change B where the second weight W2 is applied, and may move the indicator 10 based on the coordinate information of the indicator 10.

For example, the processor 130 may move the indicator 10 based on Equation 3 below.

$$PointerPosition(t) = \qquad\qquad\text{[Equation 3]}$$
$$BasePosition(t) * W1 + SubPositionDiff(t) * W2$$

According to an embodiment, the first weight W1 may be a value relatively greater than the second weight W2.

For example, it may be assumed that each of the first weight W1 and the second weight W2 has a value from 0 to 1, and the first weight W1 is 1 and the second weight W2 is 0.1.

In this case, the processor 130 may move the indicator 10 based on the coordinate information calculated by reflecting the coordinate change A of the reference point 1 as it is, and reflecting the coordinate change B of the auxiliary point 2 after reducing it by 1/10.

The coordinate change B of the auxiliary point 2 is reflected after being reduced according to the second weight W2, so that the indicator 10 can be moved small (or slightly) according to the movement of the second area (e.g., the fourth finger) (or the auxiliary point 2).

However, this is only an example, and it may be assumed that the first weight W1 has a value of 0 to 10 and the second weight W2 has a value of 0 to 1, and that the first weight W1 is 5 and the second weight W2 is 0.1.

In this case, the processor 130 may move the indicator 10 based on the coordinate information calculated by reflecting the coordinate change A of the reference point 1 by magnifying it by 5 times and reflecting the coordinate change B of the auxiliary point 2 by reducing it by 1/10.

The coordinate change A of the reference point is magnified and reflected according to the first weight W1, so that the indicator 10 can be moved large according to the movement of the first area (e.g., the wrist) (or, the reference point 1), and the coordinate change B of the auxiliary point 2 is reduced and reflected according to the second weight W2, so that the indicator 10 can be moved small (or slightly)

according to the movement of the second area (e.g., the fourth finger) (or the auxiliary point 2).

A description of the coordinate change B of the auxiliary point 2 will be described in greater detail below with reference to FIG. 5.

The processor 130 according to an embodiment applies different weights (e.g., the first weight W1 and the second weight W2) to each of the coordinate change A of the reference point and the coordinate change B of the auxiliary point 2, so that one of them is reflected as it is (or reflected after being magnified) and the other one is reflected after being reduced, thereby having the advantage of being able to move the indicator 10 more in line with the user's intent.

The first weight W1 and the second weight W2 may be fixed values, or they may be changeable values.

Figure 4:
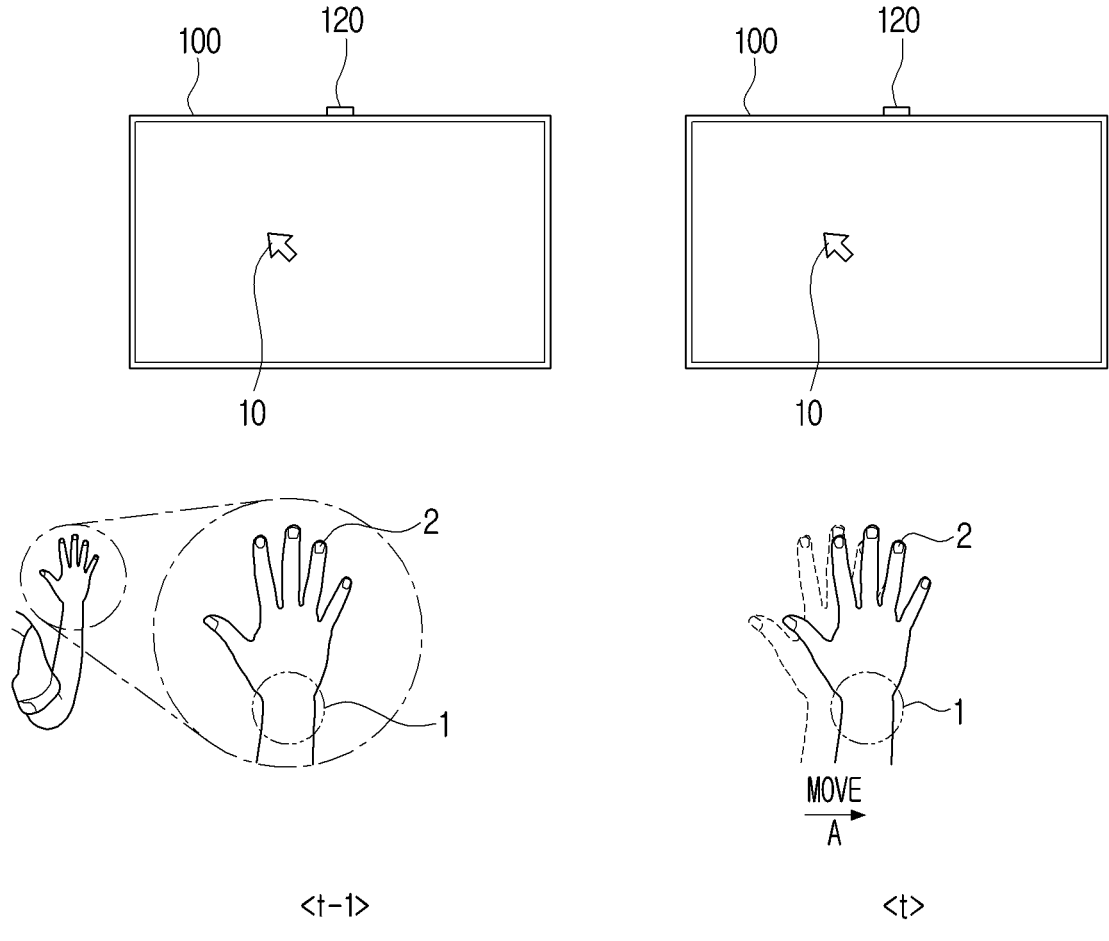
FIG. 4 is a diagram illustrating movement of an indicator in response to a movement of a first area according to various embodiments.

FIG. 4 is a diagram illustrating movement of an indicator in response to a movement of a first area according to various embodiments.

When the coordinate change A of the reference point 1 is less than a threshold value for a preset period of time, the processor 130 according to an embodiment may adjust the first weight W1 downward.

Referring to FIG. 4, the processor 130 may identify the coordinate change A of the reference point 1 based on the coordinate information of the reference point 1 at time t−1 and the coordinate information of the reference point 1 at time t.

When the coordinate change A of the reference point 1 is less than a threshold value, the processor 130 may determine that the user does not intend to move the indicator 10 using the first area, and may adjust the first weight W1 downward (e.g., from 1 to 0.5).

For example, when the coordinate change A of the reference point 1 is less than a threshold value (e.g., 5 cm) for a preset period of time (e.g., from time t−5 to time t), the processor 130 may determine that the coordinate change A of the reference point 1 is caused by an unintended tremor of the first area, an unintended movement of the first area, or the like, and may reduce and reflect (or not reflect) the coordinate change A of the reference point 1 to move the indicator 10 more in line with the user's intent.

When the coordinate change B between the auxiliary points 2 is equal to or greater than a threshold value for a preset period of time, the processor 130 according to an embodiment may adjust the second weight W2 upward (e.g., from 0.1 to 0.5).

The processor 130 according to an embodiment may identify the coordinate change B of the auxiliary point 2 based on the relative coordinate information of the auxiliary point 2 with reference to the reference point 1 at time t−1 and the relative coordinate information of the auxiliary point 2 with reference to the reference point 1 at time t.

When the coordinate change B of the auxiliary point 2 is equal to or greater than a threshold value, the processor 130 may determine that the user's intent is to move the indicator 10 using the second area, and may adjust the second weight W2 upward.

For example, when the coordinate change of the auxiliary point 2 is equal to or greater than a threshold value (e.g., 5 cm) for a preset period of time (e.g., from time t−5 to time t), the processor 130 may determine that the second area has moved according to the user's primary intent and that the coordinate change of the auxiliary point 2 has occurred in response to the movement of the second area.

Accordingly, the processor 130 may magnify (or reflect as it is) the change in the coordinates of the auxiliary point 2 to move the indicator 10 more in line with the user's intent.

The specific numbers, units, etc. in the above examples merely examples provided for convenience of explanation, and the present disclosure is not limited thereto. For example, the preset period of time may refer, for example, to from time t−10 to time t, and the threshold value may refer, for example, to 10 cm.

Figure 5:
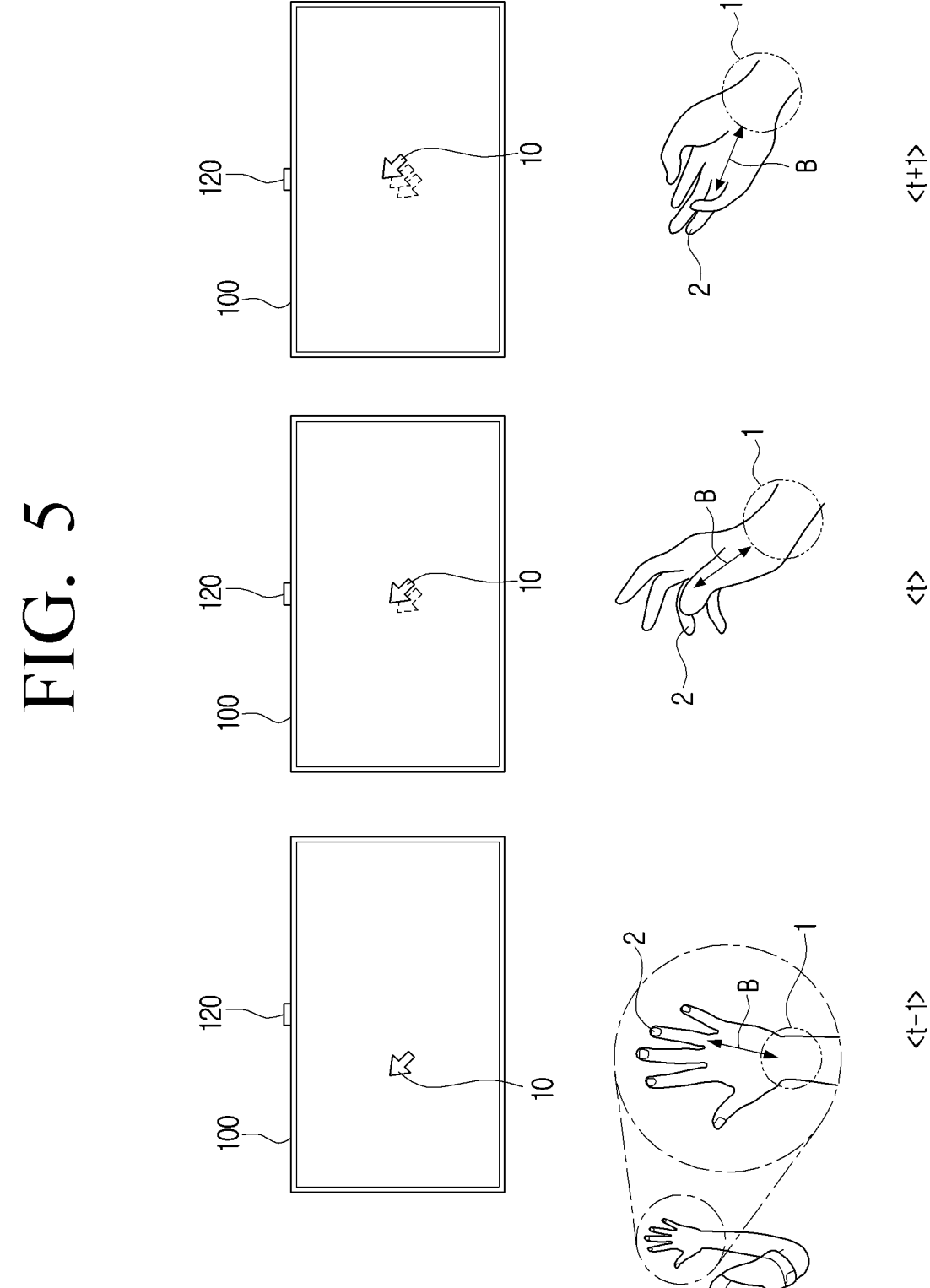
FIG. 5 is a diagram illustrating movement of an indicator in response to a movement of a second area according to various embodiments.

FIG. 5 is a diagram illustrating movement of an indicator in response to a movement of a second area according to various embodiments.

Referring to FIG. 5, the processor 130 may identify the coordinate change B of the auxiliary point 2 based on the relative coordinate information of the auxiliary point 2 with reference to the reference point 1 at time t−1 and the relative coordinate information of the auxiliary point 2 with reference to the reference point 1 at time t.

The coordinate change B of the auxiliary point 2 may correspond to the relative coordinate change of the auxiliary point 2 with reference to the reference point 1.

In an example, the processor 130 may obtain relative coordinate information of the auxiliary point 2 with reference to the reference point 1 based on coordinate information of the reference point 1 and coordinate information of the auxiliary point 2 at time t−1.

The processor 130 may obtain relative coordinate information of the auxiliary point 2 with reference to the reference point 1 at time t based on the coordinate information of the reference point 1 and the coordinate information of the auxiliary point 2. The processor 130 according to an embodiment may identify the coordinate change B of the auxiliary point 2 based on the relative coordinate information of the auxiliary point 2 at time t−1 and the relative coordinate information of the auxiliary point 2 at time t.

For example, when the coordinate information of the auxiliary point 2 has moved to the upper right with reference to the reference point 1 between time t−1 and time t, the processor 130 may move the indicator 10 to the upper right based on the coordinate change B of the auxiliary point 2, as shown in FIG. 5.

The processor 130 may apply the second weight W2 to the coordinate change B of the auxiliary point 2 to move the indicator 10 to the upper right.

For example, when the coordinate information of the auxiliary point 2 has moved to the bottom with reference to the reference point 1 between time t−1 and time t, the processor 130 may apply the second weight W2 to the coordinate change B of the auxiliary point 2 to move the indicator 10 to the bottom.

Since the processor 130 applies the first weight W1 to the coordinate change A of the reference point 1 and the second weight W2 to the coordinate change B of the auxiliary point 2, the processor 130 may move the indicator 10 finely (or precisely) according to the movement of the auxiliary point 2.

For example, since the second weight W2 is a value relatively smaller than the first weight W1, the movement of the auxiliary point 2 (e/g., the coordinate change B of the auxiliary point 2) is reduced and reflected in the movement of the indicator 10, and the processor 130 may move the indicator 10 more precisely when the user moves the auxiliary point 2 than when the user moves the reference point 1.

Figure 6:
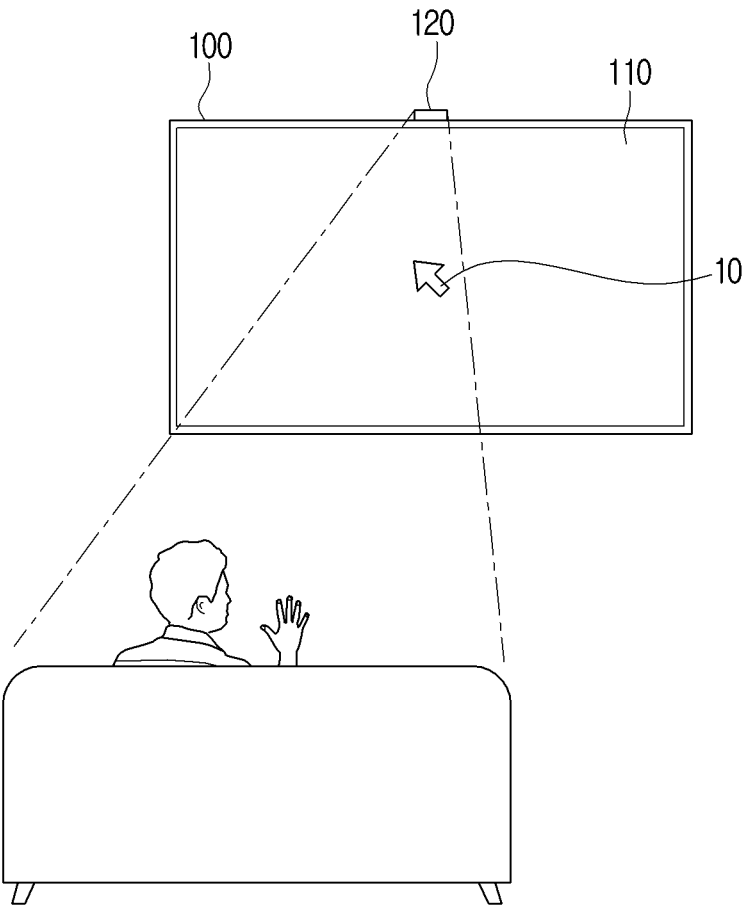
FIG. 6 is a diagram illustrating movement of an indicator in response to a user position according to various embodiments.

FIG. 6 is a diagram illustrating movement of an indicator in response to a user position according to various embodiments.

The display device 100 according to an embodiment may further include memory (not shown).

According to an embodiment, the memory may store data required for various embodiments of the present disclosure. The memory may be implemented in the form of memory embedded in the display device 100, or may be implemented in the form of memory removably attached to the display device 100, depending on the purpose of storing data.

For example, in the case of data for driving the display device 100, the data may be stored in the memory embedded in the display device 100, and in the case of data for the expansion function of the display device 100, the data may be stored in the memory detachable from the display device 100. The memory embedded in the display device 100 may be implemented as at least one of a volatile memory (e.g. a dynamic RAM (DRAM), a static RAM (SRAM), or a synchronous dynamic RAM (SDRAM)), or a non-volatile memory (e.g., a one-time programmable ROM (OTPROM), a programmable ROM (PROM), an erasable and program-mable ROM (EPROM), an electrically erasable and pro-grammable ROM (EEPROM), a mask ROM, a flash ROM, a flash memory (e.g. a NAND flash or a NOR flash), a hard drive, or a solid state drive (SSD)). The memory detachable from the display device 100 may be implemented in the form of a memory card (e.g., a compact flash (CF), a secure digital (SD), a micro secure digital (Micro-SD), a mini secure digital (Mini-SD), an extreme digital (xD), or a multi-media card (MMC)), an external memory connectable to a USB port (e.g., a USB memory), or the like.

In an example, the memory may store a computer pro-gram including at least one instruction or a set of instructions for controlling the display device 100.

For example, the memory may store weight information for each position of the user.

In an example, the memory may store weight information corresponding to each of a plurality of positions, and the plurality of positions may include, for example, i) a lying position, ii) a sitting position, iii) a standing position, and the like. However, the plurality of positions may also include, but are not limited to, iv) a side lying position (recumbent position), and the like.

In an example, the processor 130 may identify a position corresponding to the user's body among the plurality of positions.

The processor 130 may identify weight information cor-responding to the identified position.

Based on the identified weight information, the processor 130 may apply the first weight to the coordinate change A of the reference point 1 and the second weight to the distance change B between the auxiliary points 2.

Referring to FIG. 6, when the user's position is identified as a first position (e.g., sitting position) based on the image, the processor 130 may identify weight information corre-sponding to the first position.

In an example, the first weight included in the weight information corresponding to the first position may be a value relatively greater than the second weight.

For example, since it is easy for the user to move both the first area and the second area in the sitting position, the processor 130 may apply a relatively high weight (first weight W1) to the coordinate change A of the reference point 1 corresponding to the movement of the first area and a relatively low weight (second weight W2) to the coordinate change B of the auxiliary point 2 corresponding to the movement of the second area.

When the user's position changes from the first position to the second position (e.g., lying position) between time t−1 and time t, the processor 130 may identify weight informa-tion corresponding to the second position.

The processor 130 may apply the first weight to the coordinate change A of the reference point 1 and the second weight to the coordinate change B of the auxiliary point 2 based on the weight information corresponding to the sec-ond position.

In an example, the first weight included in the weight information corresponding to the second position may be a value relatively smaller than the second weight. An embodi-ment thereof will be described in greater detail below with reference to FIG. 7.

Figure 7:
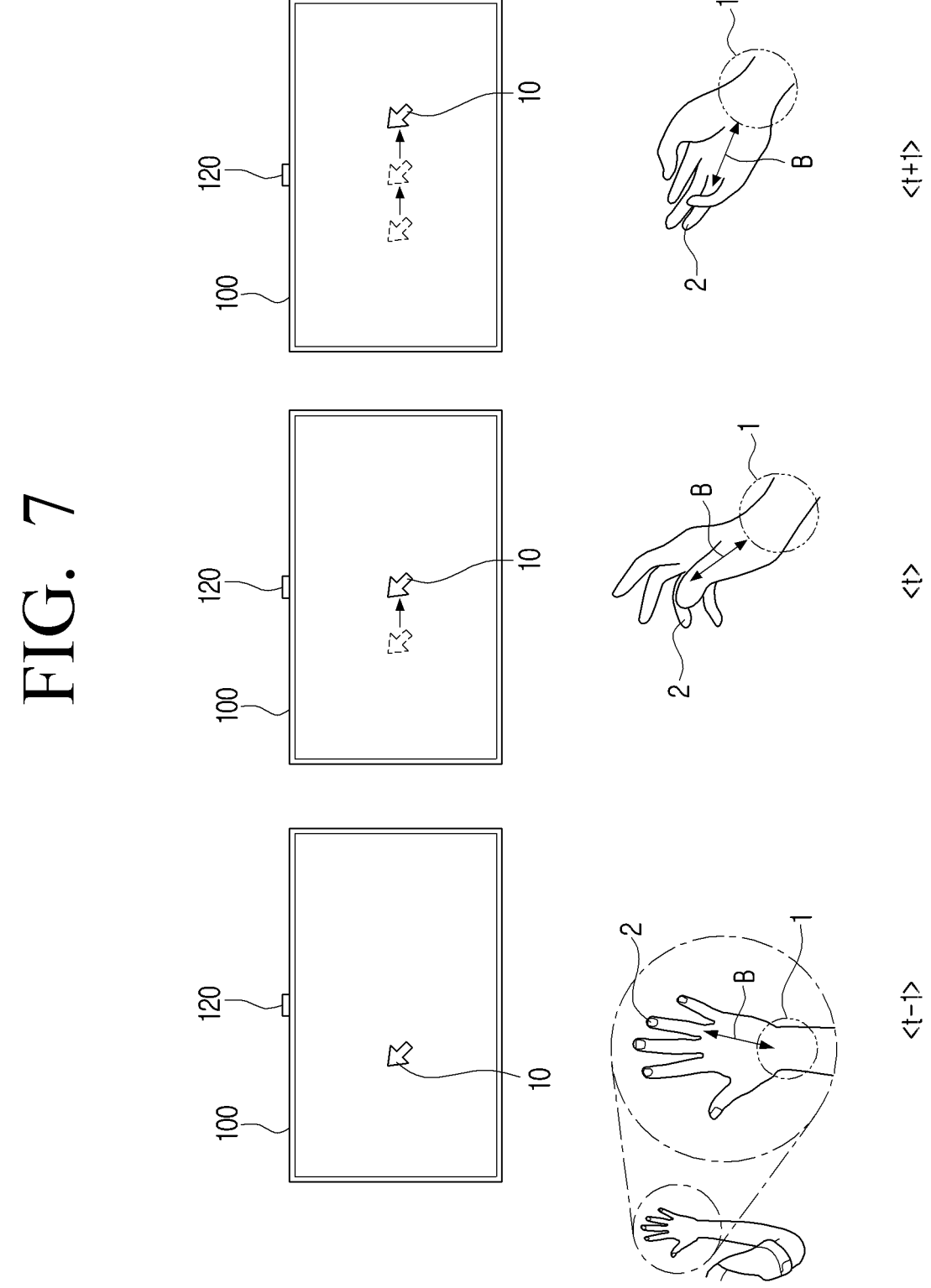
FIG. 7 is a diagram illustrating movement of an indicator in response to a movement of a second area according to various embodiments.

FIG. 7 is a diagram illustrating movement of an indicator in response to a movement of a second area according to various embodiments.

For example, since it is not easy for the user to move the first area (e.g., the wrist), but it is easy for the user to move the second area (e.g., the fourth finger) in the lying position, the processor 130 may apply a relatively low weight (first weight W1) to the coordinate change A of the reference point 1 corresponding to the movement of the first area and a relatively high weight (second weight W2) to the coordinate change B of the auxiliary point 2 corresponding to the movement of the second area.

Referring to FIGS. 5 and 7, even though the coordinate change B of the auxiliary point 2 is the same, in the position assumed in FIG. 5 (e.g., standing position, sitting position, etc.), a relatively low weight is applied to the coordinate change B of the auxiliary point 2 to move the indicator 10 slightly, and in the posture assumed in FIG. 7 (e.g., lying position), a relatively high weight is applied to the coordi-nate change B of the auxiliary point 2 to move the indicator 10 significantly.

However, this is only an example, and the opposite of the above-described example is also possible.

For example, in the lying position, the processor 130 may apply a relatively high weight (first weight W1) to the coordinate change A of the reference point 1 corresponding to the movement in the first area, and a relatively low weight (second weight W2) to the coordinate change B of the auxiliary point 2 corresponding to the movement in the second area.

In the various examples described above, time points t−1, t, and t+1 refer to one frame interval (e.g., one frame before time point t is t−1 and one frame after time point t is t+1), but are of course not limited thereto. For example, it is also possible that a preset time interval (for example, 0.5 sec-onds, 1 second, etc.) before time point t may refer, for example, to t−1, and that a preset time interval after time point t may refer, for example, to t+1.

Figure 8:
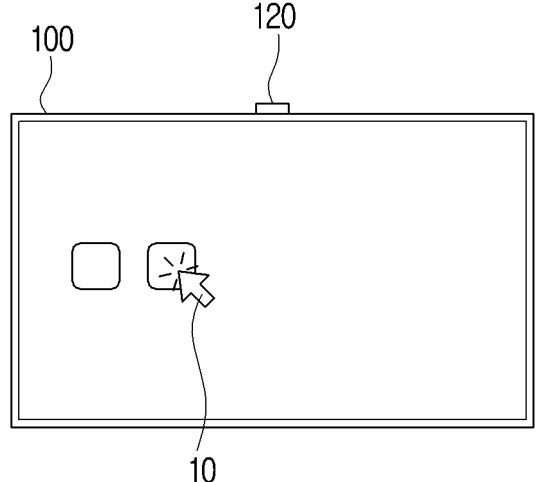
FIG. 8 is a diagram illustrating a selection command according to various embodiments.
Figure 8:
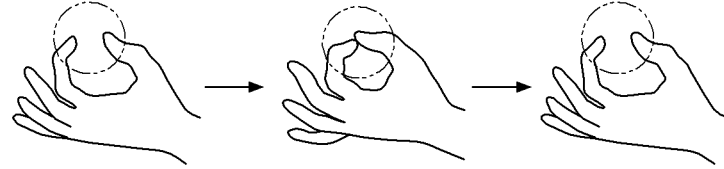

FIG. 8 is a diagram illustrating an example selection command according to various embodiments.

The processor 130 according to an embodiment may identify a third area in the image.

When a preset action is detected in the third area, the processor 130 may obtain a selection command for the indicator 10. The processor 130 may perform an operation corresponding to the selection command (e.g., the operation of selecting a character, an item, an object, etc. correspond-ing to the current location of the indicator 10, a click operation).

The processor 130 may identify as the third area an area in which each of the coordinate change A of the reference point 1 and the coordinate change B of the auxiliary point 2 is less than a threshold value while the preset action is being performed on the user's body.

For example, as the user performs a preset action in the third area of the user's body, causing an unintended tremor, an unintended movement, etc. in the first and second areas, a problem that the indicator 10 moves differently from the user's intent occurs.

Accordingly, the processor 130 may identify as the third area an area in which no unintended movement or the like occurs in the first and second areas while performing a preset action among various body parts of the user, for example, an area in which each of the coordinate change A of the reference point 1 and the coordinate change B of the auxiliary point 2 is less than a threshold value.

For example, referring to FIG. 8, the preset action is a joint action of two fingers, and the processor 130 may identify the first finger and the second finger as the third area.

As shown in FIG. 8, no unintended movement of the user may occur in the first area (e.g., the wrist) and the second area (e.g., the fourth finger) while the joint action of the first finger and the second finger is being performed.

As described above, the processor 130 may identify an area in which no unintended movement or the like occurs in the first and second areas while a preset action is being performed on the user's body as the third area, or may identify a preset area within the body (e.g., the first finger and the second finger) as the third area.

In the examples described above, it is assumed that the joint action of two fingers the preset action, but this is an example and the present disclosure is not limited thereto.

For example, the preset action may be a double tap action of any of the user's fingers, in which case the processor 130 may identify any of the first finger, the second finger in which no unintended movement or the like occurs in the first and second areas while a preset action is being performed on the user's body as the third area.

Figure 9:
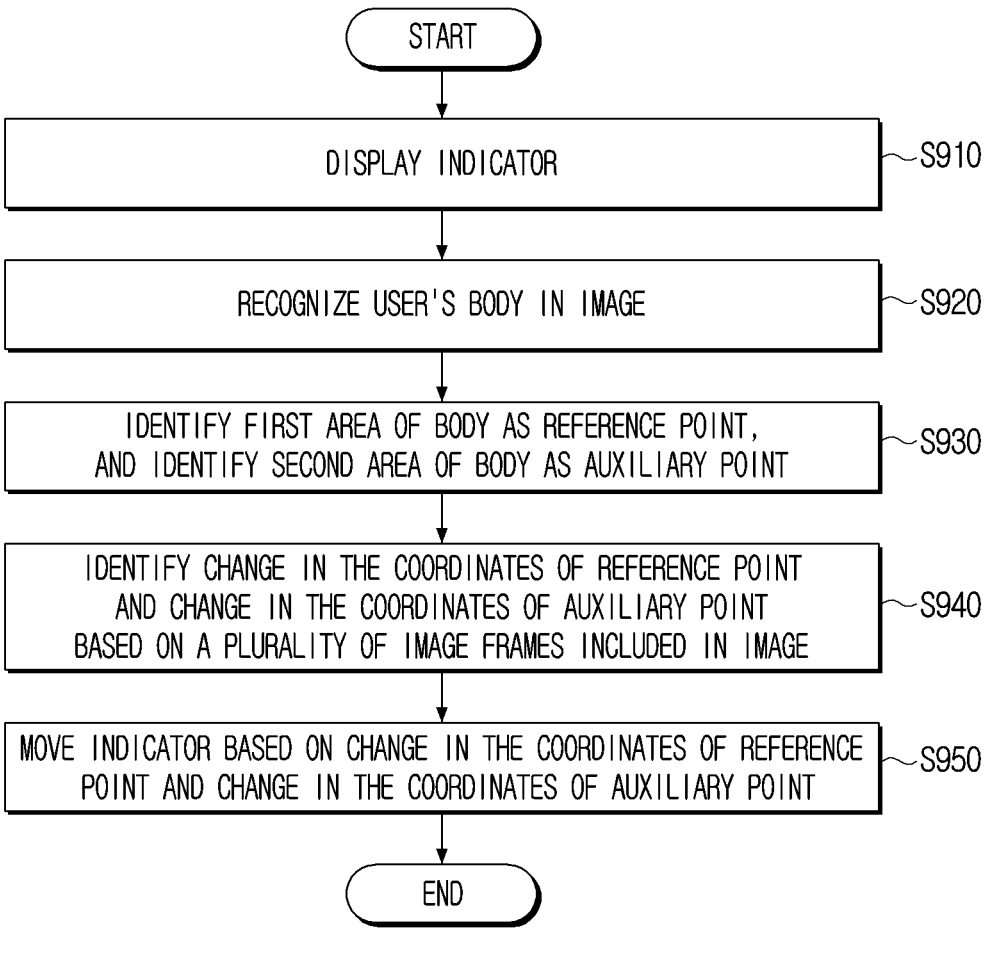
FIG. 9 is a flowchart illustrating an example method of controlling a display device according to various embodiments.

FIG. 9 is a flowchart illustrating an example method of a display device according to various embodiments.

A method of controlling a display device, according to an embodiment of the present disclosure, first displays an indicator (S910).

The user's body is recognized from the image received in real time (S920).

The first area of the body is identified as the reference point, and the second area is identified as the auxiliary point (S930).

Based on a plurality of image frames included in the image, the coordinate change of the reference point and the coordinate change of the auxiliary point are identified (S940).

The indicator is moved based on the change in the coordinates of the reference point and the change in the coordinates of the auxiliary point (S950).

The change in the coordinates of the auxiliary point corresponds to the change in the relative coordinates of the auxiliary point with reference to the reference point.

The operation S950 of moving the indicator includes applying a first weight to a coordinate change of the reference point, applying a second weight to a coordinate change of the auxiliary point, and moving the indicator by summing the coordinate change with the first weight and the coordinate change with the second weight, wherein the first weight may be a value that is relatively greater than the second weight.

The method according to an example embodiment of the present disclosure may further comprise adjusting the first weight downwardly if the change in the coordinates of the reference point is below a threshold value for a period of time.

The method according to an example embodiment may further include adjusting the second weight upward if the coordinate change of the auxiliary point is above a threshold value for a period of time.

The operation S950 of moving the indicator according to an embodiment may include: identifying a position corresponding to the user's body; identifying weight information corresponding to the identified position; applying a first weight to a coordinate change of the reference point based on the identified weight information; applying a second weight to the coordinate change of the auxiliary point; and moving the indicator by summing the first weighted coordinate change and the second weighted coordinate change.

In step S950 of moving the indicator according to an embodiment, if the user's position is identified as a first position according to the image, applying a first weight included in the first weight information corresponding to the first position to the coordinate change of the reference point, applying a second weight included in the first weight information to the change in the coordinates of the auxiliary point, and, if the user's position changes from the first position to the second position according to the image, applying a first weight included in the second weight information corresponding to the second position to the change in the coordinates of the reference point, and applying a second weight included in the second weight information to the change in the coordinates of the auxiliary point.

The method according to an example embodiment may further include identifying a third area in the image, obtaining a selection command for the indicator when a specified behavior is detected in the third area, and performing an action corresponding to the selection command.

The step of identifying the third area in the image may include identifying the area in which the coordinate change of the reference point and the coordinate change of the auxiliary point are each below a threshold value while the prescribed action is performed as the third area, or identifying the prescribed area within the body as the third area.

According to an example embodiment, the first area may be a wrist of the user, and the second area may be any of the fingers of the user.

It should be appreciated, however, that various embodiments of the present disclosure can be applied to any type of electronic device having a display, not just the display device.

The above-described various embodiments may be implemented in a recording medium that can be read by a computer or a similar device using software, hardware, or a combination thereof. In some cases, embodiments described herein may be implemented by a processor itself. According to software implementation, embodiments such as procedures and functions described in this disclosure may be implemented as separate software modules. Each of the software modules may perform one or more functions and operations described in this disclosure.

Meanwhile, computer instructions for performing processing operations of the electronic device 100 according to the above-described various embodiments may be stored in a non-transitory computer-readable medium. When being executed by a processor of a specific device, the computer instructions stored in such a non-transitory computer-readable medium allows the specific device to perform processing operations of the electronic device 100 according to the above-described various embodiments.

The non-transitory computer-readable medium refers to a medium that stores data semi-permanently and can be read by a device. Specific examples of the non-transitory computer-readable medium may include CD, DVD, hard disk, Blu-ray disk, USB, memory card, ROM, etc.

While the disclosure has been illustrated and described with reference to various example embodiments, the disclosure is not limited to the embodiments described above, and various modifications may be made by one of ordinary skill in the art without departing from the spirit and scope of the disclosure including the appended claims and their equivalents. It will also be understood that any of the embodiment(s) described herein may be used in conjunction with any other embodiment(s) described herein.

What is claimed is:

1. A display device comprising:
a display;
a sensor; and
at least one processor, comprising processing circuitry, individually and/or collectively, configured to:
control the display to display an indicator;
recognize a user's body in an image received through the sensor in real time;
identify a first area of the user's body as a reference point, and identify a second area of the user's body as an auxiliary point;
identify a change in coordinates of the reference point and a change in coordinates of the auxiliary point based on a plurality of image frames included in the image; and
move the indicator based on the change in the coordinates of the reference point and the change in the coordinates of the auxiliary point,
wherein the change in the coordinates of the auxiliary point is a relative change in the coordinates of the auxiliary point relative to the reference point, and
wherein the at least one processor, individually and/or collectively, is configured to:
apply a first weight to the change in the coordinates of the reference point, and apply a second weight to the change in the coordinates of the auxiliary point; and
move the indicator by using the change in coordinates where the first weight is applied and the change in coordinates where the second weight is applied; and
wherein the first weight is greater than the second weight.

2. The display device as claimed in claim 1, wherein at least one processor, individually and/or collectively, is configured to:
based on the change in the coordinates of the reference point being less than a threshold value for a specified period of time, adjust the first weight downward.

3. The display device as claimed in claim 1, wherein at least one processor, individually and/or collectively, is configured to:
based on the change in the coordinates of the auxiliary point being equal to or greater than a threshold value for a specified period of time, adjust the second weight upward.

4. The display device as claimed in claim 1, further comprising:
memory storing weight information for each user position,
wherein at least one processor, individually and/or collectively, is configured to:
identify a position corresponding to the user's body;
identify weight information corresponding to the identified position; and
apply the first weight to the change in the coordinates of the reference point and apply the second weight to the change in the coordinates of the auxiliary point based on the identified weight information.

5. The display device as claimed in claim 4, wherein at least one processor, individually and/or collectively, is configured to:
based on the user's position being identified as a first position according to the image, apply a first weight included in first weight information corresponding to the first position to the change in the coordinates of the reference point and apply a second weight included in the first weight information to the change in the coordinates of the auxiliary point; and
based on the user's position being changed from the first position to a second position according to the image, apply a first weight included in second weight information corresponding to the second position to the change in the coordinates of the reference point, and apply a second weight included in the second weight information to the change in the coordinates of the auxiliary point.

6. The display device as claimed in claim 1, wherein at least one processor, individually and/or collectively, is configured to:
identify a third area in the image;
based on a specified operation being detected in the third area, obtain a selection command for the indicator; and
perform an operation corresponding to the selection command.

7. The display device as claimed in claim 6, wherein at least one processor, individually and/or collectively, is configured to:
identify an area where each of the change in the coordinates of the reference point and the change in the coordinates of the auxiliary point is less than a threshold value while the specified operation is performed as the third area, or identify a specified area within the user's body as the third area.

8. The display device as claimed in claim 1, wherein the first area includes the user's wrist; and
wherein the second area includes one of the user's fingers.

9. A method of controlling a display device, the method comprising;
displaying an indicator;
recognizing a user's body in an image received in real time;
identifying a first area of the user's body as a reference point, and identifying a second area of the user's body as an auxiliary point;
identifying a change in coordinates of the reference point and a change in coordinates of the auxiliary point based on a plurality of image frames included in the image; and
moving the indicator based on the change in the coordinates of the reference point and the change in the coordinates of the auxiliary point,
wherein the change in the coordinates of the auxiliary point is a relative change in the coordinates of the auxiliary point relative to the reference point,
wherein the moving the indicator comprises:
applying a first weight to the change in the coordinates of the reference point, and applying a second weight to the change in the coordinates of the auxiliary point; and
moving the indicator by using the change in coordinates where the first weight is applied and the change in coordinates where the second weight is applied; and
wherein the first weight is greater than the second weight.

10. The method as claimed in claim 9, further comprising:

based on the change in the coordinates of the reference point being less than a threshold value for a specified period of time, adjusting the first weight downward.

11. The method as claimed in claim 9, further comprising:

based on the change in the coordinates of the auxiliary point being equal to or greater than a threshold value for a specified period of time, adjusting the second weight upward.

12. The method as claimed in claim 9, wherein the moving the indicator comprises:

identifying a position corresponding to the user's body;

identifying weight information corresponding to the identified position; and applying the first weight to the change in the coordinates of the reference point and applying the second weight to the change in the coordinates of the auxiliary point based on the identified weight information.

13. The method as claimed in claim 12, wherein the moving the indicator comprises:

based on the user's position being identified as a first position according to the image, applying a first weight included in first weight information corresponding to the first position to the change in the coordinates of the reference point and applying a second weight included in the first weight information to the change in the coordinates of the auxiliary point; and based on the user's position being changed from the first position to a second position according to the image, applying a first weight included in second weight information corresponding to the second position to the change in the coordinates of the reference point, and applying a second weight included in the second weight information to the change in the coordinates of the auxiliary point.

14. A non-transitory computer-readable recording medium storing computer instructions that when executed by at least one processor, comprising processing circuitry, of a display device, individually and/or collectively, cause the display device to:

display an indicator;

recognize a user's body in an image received in real time;

identify a first area of the user's body as a reference point, and identifying a second area of the user's body as an auxiliary point;

identify a change in coordinates of the reference point and a change in coordinates of the auxiliary point based on a plurality of image frames included in the image; and move the indicator based on the change in the coordinates of the reference point and the change in the coordinates of the auxiliary point, wherein the change in the coordinates of the auxiliary point is a relative change in the coordinates of the auxiliary point relative to the reference point, wherein the computer instructions further cause the display device to:

apply a first weight to the change in the coordinates of the reference point, and applying a second weight to the change in the coordinates of the auxiliary point; and move the indicator by using the change in coordinates where the first weight is applied and the change in coordinates where the second weight is applied; and wherein the first weight is greater than the second weight.

15. The non-transitory computer-readable recording medium of claim 14, wherein the computer instructions further cause the display device to:

based on the change in the coordinates of the reference point being less than a threshold value for a specified period of time, adjust the first weight downward.

16. The non-transitory computer-readable recording medium of claim 14, wherein the computer instructions further cause the display device to:

based on the change in the coordinates of the auxiliary point being equal to or greater than a threshold value for a specified period of time, adjust the second weight upward.

17. The non-transitory computer-readable recording medium of claim 14, wherein the computer instructions further cause the display device to:

identify a position corresponding to the user's body;

identify weight information corresponding to the identified position; and apply the first weight to the change in the coordinates of the reference point and applying the second weight to the change in the coordinates of the auxiliary point based on the identified weight information.

* * * * *